United States Patent [19]
Rollins et al.

[11] Patent Number: 5,307,508
[45] Date of Patent: Apr. 26, 1994

[54] SHOCK ISOLATION FOR SELECTIVE CALL RECEIVERS

[75] Inventors: Thomas J. Rollins, Boca Raton; Charles W. Mooney, Lake Worth; Irving H. Holden, Boca Raton, all of Fla.

[73] Assignee: Motorola, Inc., Schaumburg, Ill.

[21] Appl. No.: 698,880

[22] Filed: May 13, 1991

[51] Int. Cl.⁵ .............................. H04B 7/00
[52] U.S. Cl. ................... 455/38.1; 455/90; 455/351; 361/753; 361/814; 340/825.44
[58] Field of Search ............... 455/90, 347, 348, 349, 455/351, 38.1; 361/386–388, 395, 403, 414, 415, 422, 424; 174/52.1, 52.2; 206/305, 523, 592; 340/825.44, 387, 407

[56] References Cited

U.S. PATENT DOCUMENTS

| | | | |
|---|---|---|---|
| 3,443,661 | 5/1969 | Sciver | 455/347 |
| 3,693,089 | 9/1972 | Hutchinson et al. | 455/351 |
| 4,001,655 | 1/1977 | Voyles et al. | 174/52.2 |
| 4,414,606 | 11/1983 | Anderson et al. | 174/52.2 |
| 4,694,555 | 9/1987 | Russell et al. | 361/395 |
| 4,833,726 | 5/1989 | Shinoda et al. | 455/90 |

Primary Examiner—Reinhard J. Eisenzopf
Assistant Examiner—Andrew Faile
Attorney, Agent, or Firm—Pablo Meles; Thomas G. Berry; Keith Chanroo

[57] ABSTRACT

A shock isolator (30) is provided within the housing (38) of a selective call receiver to substantially increase the natural frequency of vibration of the housing (38) and the printed circuit boards (54, 56) within the housing. The shock isolator (30) is a body of elastomeric material, preferably butyl rubber, which has component receiving apertures (32) molded therein for receiving the components (46, 48, 50) on the printed circuit board while at the same time contacting the printed circuit board. The butyl rubber has a damping of at least 25% (preferably 50%) and a Durometer of between 50 and 70 type A (preferably 60).

6 Claims, 2 Drawing Sheets

SHOCK ISOLATION FOR SELECTIVE CALL RECEIVERS

FIELD OF THE INVENTION

This invention relates generally to shock isolation techniques in electronic devices, and more particularly, to an apparatus and method for improving the reliability of a selective call receiver by reducing the amplitude of deflections of the selective call receiver's constituent parts (i.e. printed circuit boards, housing, electronic components, etc.) which occur in response to sudden mechanical impacts or shocks.

BACKGROUND OF THE INVENTION

Communication systems in general, and paging systems in particular, have attained widespread use. In such paging systems, transmitted call signals are used to call selected receivers for the purpose of transmitting information from a base station to the selected receivers. Modern paging receivers have achieved multifunction capabilities through the use of microprocessors which allow the receivers to respond to information containing various combinations of tone, tone and voice, or data messages in a variety of modes. This information may be transmitted using several paging coding schemes and message formats.

Some considerations governing the successful operation of a paging receiver relate to the portability of the receiver, battery saving, available memory, radio spectrum availability, and fast response time. Equally important, however, is reliability, one aspect of which is the device's ability to continue to function properly after sudden mechanical impacts and shocks (e.g., dropping the unit onto a hard surface).

Modern selective call receiver units generally include relatively thin printed circuit boards, housings which are typically made of a plastic type material, and fragile electronic components. The plastic housing's front and back planes typically have a low frequency response to sudden impact resulting in relatively large deflections which will result in secondary impacts with the internal printed circuit board components. Certain ones of these components are fragile in nature; i.e. some components are constructed of quartz, ceramic, and silicon. Each of these components themselves have a natural frequency response to impact that amplifies the incoming shock.

The relatively thin printed circuit boards themselves have a low frequency response to shock resulting in large deflections. They also have a variable frequency of vibration response across the printed circuit board due to the variation in components' weight across the board. Furthermore, vibrations of the printed circuit board are undamped. The natural vibration frequency response of the housing may be approximately 390 Hz resulting in a deflection of 0.07 inches. The frequency of vibration of the printed circuit board will range from 200–300 Hz resulting in a deflection of 0.14 inches. Modern low volumetric selective call receivers do not permit tolerances of a significant amplitude to accommodate such deflections. As a result, sudden mechanical shocks result in unit failures. Large impacts, whether primary or secondary, create detached or broken solder joints in integrated circuits, ceramic filters, and other components. The excessive printed circuit board deflections overstress and fatigue solder joints resulting in failure.

The current method of providing shock isolation within a selective call receiver is to place one or more pieces of shock isolating material in selected areas. Unfortunately, this approach has provided a limited amount of shock isolation in a single direction only and does not solve all of the problems described above.

Other sources of device failure stem from the fact that the interior of modern selective call receiver housings contains a large volume of air. This may result in the formation of condensation which can adversely affect the electrical operation of the device. Furthermore, it is possible for contaminants such as water to enter the housing and occupy these regions likewise causing device failure.

Thus, what is required is an apparatus for shock isolating the selective call receiver and its constituent parts by occupying the normally void internal portions of the receiver housing and altering the frequency response to mechanical shock of the receiver unit and its constituent parts so as to minimize their deflection.

SUMMARY OF THE INVENTION

According to a broad aspect of the invention, there is provided a selective call receiver of the type which alerts a user that a transmitted address matches an address stored in the receiver. A housing is provided within which resides a printed circuit board. Electronic circuitry for receiving and decoding the transmitted address to determine if it matches the stored address is mounted on the printed circuit board, and means are provided for generating an alert when the transmitted address matches the stored address. Shock isolation means are provided for substantially increasing the natural frequency of vibration of the printed circuit board.

DESCRIPTION OF THE PREFERRED EMBODIMENT

Figure 1:
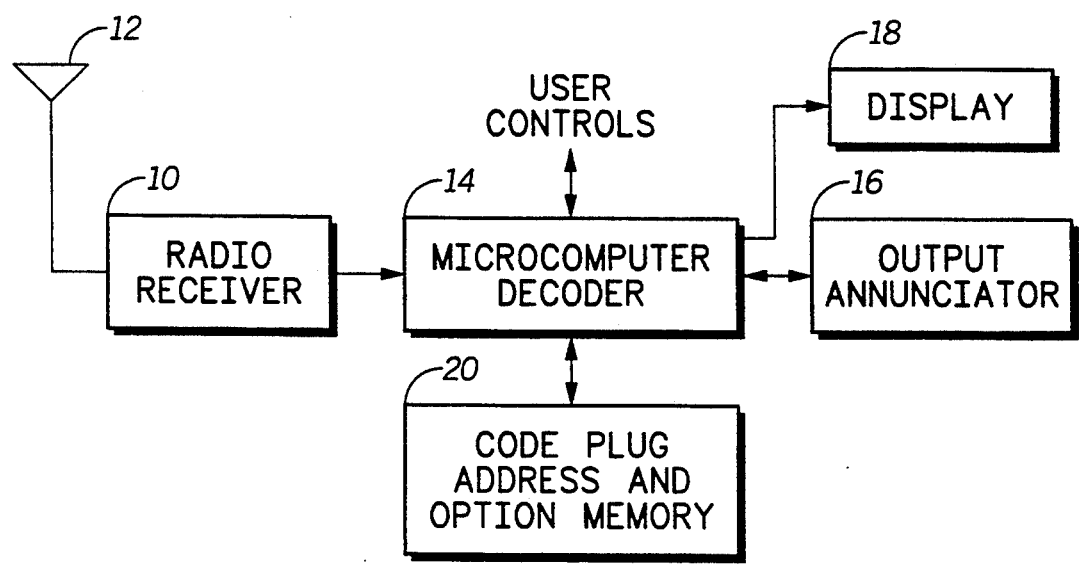
FIG. 1 is a block diagram of a prior art paging receiver.

FIG. 1 is a block diagram of a typical paging receiver. It includes a radio receiver 10 which receives signals via antenna 12. The output of the radio receiver is applied to a microcomputer decoder 14 which processes the information contained in the received signals. As can be seen, microcomputer decoder 14 communicates with output annunciator 16, display 18, code plug address and option memory 20, and the user via controls on the pager. The operation of a paging receiver of the type shown in FIG. 1 is well known and is more fully described in U.S. Pat. No. 4,518,961, issued May 21, 1985, entitled "Universal Paging Device with Power Conservation."

Figure 2:
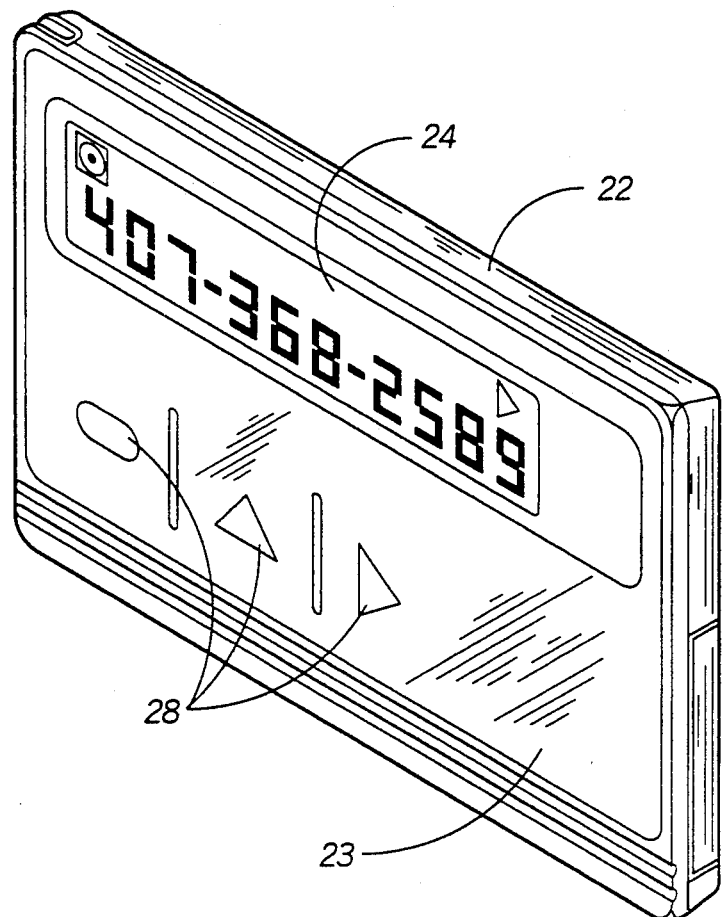
FIG. 2 is an isometric view of a paging receiver in a credit card format.

FIG. 2 is an isometric view of a paging receiver constructed in a low volumetric (e.g. credit card) format. As can be seen, the pager includes a housing 22 having a front plane 23 and a back plane (not shown). A display 24 is visible through an aperture in front plane 23, and user operated controls 28 are provided.

Figure 3:
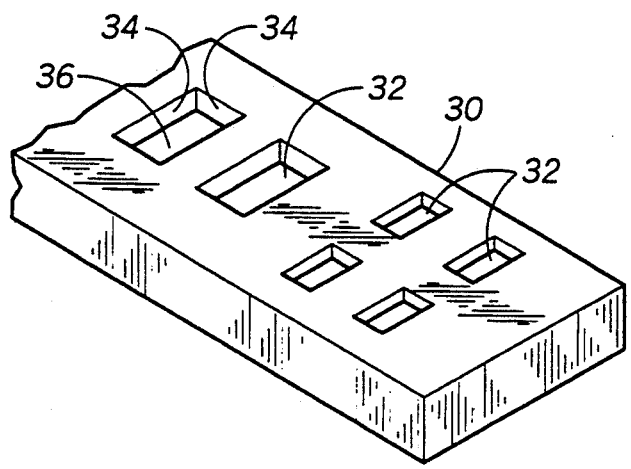
FIG. 3 is an isometric view of a shock isolator or snubber in accordance with the teachings of the present invention.

FIG. 3 is an isometric view of a shock isolator or snubber 30 for use in achieving the objectives of the present invention. The snubber 30 which may be manufactured by molding comprises a piece of damping material having a desired Durometer and configuration so as to raise a natural frequency of vibration (and therefore reduce the amount of deflection due to shock) of a selective call receiver housing and a circuit supporting substrate or printed circuit board positioned therein. The material itself should have a damping of at least 25% (preferably 50%) and exhibit a Durometer of between 50–70 (type A) and preferably 60 (type A). The snubber material should be sulfur-free so as not to attack the electronic components on the printed circuit board, should be carbon-free so as to be non-conductive, and should not attack or degrade the polycarbonate pager housing.

Elastomeric materials such as polyurethane which possess the required characteristics of damping and stiffness are available and are suitable for use in accordance with the teachings of the present invention. A preferred material, however, which provides superior results is butyl rubber.

Referring again to FIG. 3, it can be seen that snubber is provided with a plurality of component receiving pockets or apertures 32. Each pocket has side walls 34 and preferably a base 36. This provides component-to-component isolation in five planes. Shock isolator 30 and pockets 32 are preferably formed during the molding process.

Figure 4:
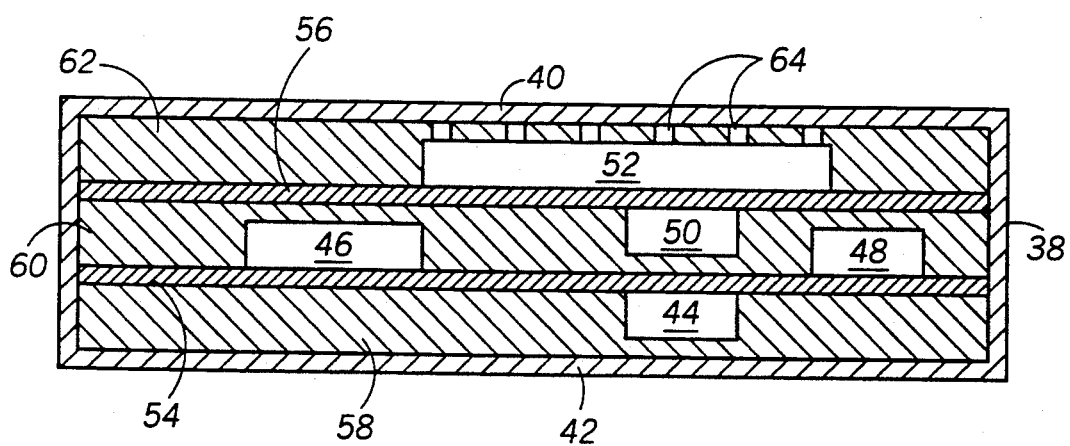
FIG. 4 is a cross-sectional view of a typical paging device incorporating a shock isolator of the type shown in FIG. 3.

FIG. 4 is a cross-sectional view of a typical paging device. It includes a housing 38 having front and back planes 40 and 42, respectively. Electronic circuitry includes components 44, 46, 48, 50, and 52. Components 44, 46, and 48 are mounted on printed circuit board 54, and components 50 and 52 are mounted on printed circuit board 56. While two printed circuit boards are shown for convenience, it should be clear that the device could include less than or more than two circuit supporting substrates or boards.

Three shock isolators are used in the device shown in FIG. 4. The first, 58, occupies the space between back plane 42 and printed circuit board 54 and includes a pocket for receiving component 44. The second shock isolator 60 occupies the space between printed circuit boards 54 and 56 and includes pockets for receiving components 46, 48, and 50. The third shock isolator or snubber 62 is positioned between printed circuit board 56 and front plane 40.

By employing the shock isolator shown in FIGS. 3 and 4, the natural frequency of the housing and the printed circuit boards can be raised to, for example, 2,000 Hz, thus reducing deflections to approximately 0.015 inches. The arrangement provides printed circuit board-to-housing wall isolation, printed circuit board-to-printed circuit board isolation, and component-to-component isolation.

As stated previously, there may be a variable frequency response across the printed circuit board. Frequency adjustment for any particular area of the printed circuit board can be obtained by increasing or decreasing the contact area between the shock isolator and the printed circuit board. For example, referring again to FIG. 4, the natural frequency of vibration of printed circuit board 56 in the region of component 52 will not be altered to the degree that the remainder of the printed circuit board 56 due to aperture 64 in shock isolator 62. Aperture 64 can be formed during the molding process. Component pockets 32 cause the shock isolators to be self-positioning, thus assuring that apertures 64 reside in the proper region.

Thus, the inventive shock isolation technique will result in a more reliable selective call receiver by allowing the designer to define the required frequency response needed for minimum deflection of both the printed circuit boards and the housing. The final design will also eliminate the variable frequency response across the printed circuit board, and the number of vibration cycles will be reduced. Finally, the shock isolation material will occupy the space (i.e. preferably with a substantially zero tolerance fit) normally occupied by air thus reducing failures due to condensation and assisting in preventing moisture from entering the housing.

We claim:

1. A selective call receiver of the type which alerts the user of said receiver that a transmitted address matches an address stored in said receiver, comprising:
   a housing;
   a printed circuit board within said housing;
   electronic circuitry for receiving and decoding said transmitted address to determine if said transmitted address matches the stored address, at least a portion of said circuitry mounted on said printed circuit board;
   alert means for generating an alert when transmitted address matched the stored address; and
   shock isolation means within said housing for substantially increasing the natural frequency of vibration of said printed circuit board and said housing, wherein said natural frequency of vibration varies across said printed circuit board and said housing, said shock isolation means having at least one component receiving aperture for receiving at least one of said portion of electronic circuitry such that said aperture provides isolation between at least one of said portion of electronic circuitry in five planes and at least one other portion of electronic circuitry, said shock isolation means comprising a body of elastomeric material having a damping of at least 25% and a durometer of between 50 and 70.

2. A selective call receiver of the type which alerts the user of said receiver that a transmitted address matches an address stored in said receiver, comprising;
   a housing;
   at least one printed circuit board having first and second surfaces within said housing;
   electronic circuitry for receiving and decoding said transmitted address to determine if said transmitted address matches the stored address, at least a portion of said circuitry mounted on said printed circuit board;
   alert means for generating an alert when transmitted address matched the stored address;
   first shock isolation means positioned between said housing and the first surface of said printed circuit board for increasing the natural frequency of vibration of said printed circuit board and said housing, said shock isolation means having at least one component receiving aperture for receiving at least one of said portion of electronic circuitry, wherein a contact area of said first shock isolation means and said at least one component is modified to provide a frequency of vibration of said at least one electronic circuitry different from a frequency of vibration of said printed circuit board and said housing, said aperture providing isolation between each of said at least one of said portion of electronic circuitry in five planes; and second shock isolation means positioned between said housing and the second surface of said printed circuit board, said first and second shock isolation means substantially filling the empty space within said housing, said first and second shock isolation means comprising a body of elastomeric material having a damping of at least 25% and a durometer substantially between 50 and 70.

3. The selective call receiver of claim 1, wherein the elastomeric material comprises butyl rubber.

4. The selective call receiver of claim 1, wherein the elastomeric material comprises polyurethane.

5. The selective call receiver of claim 2, wherein the elastomeric material comprises butyl rubber.

6. The selective call receiver of claim 2, wherein the elastomeric material comprises polyurethane.

* * * * *